United States Patent
Lin et al.

(10) Patent No.: US 12,223,158 B2
(45) Date of Patent: Feb. 11, 2025

(54) METHOD FOR GENERATING A TREE DIAGRAM FROM A CAPITALIZATION TABLE

(71) Applicant: BluePlanet Inc., Taipei (TW)

(72) Inventors: Bo-Ru Lin, Taipei (TW); Shang-De You, Taipei (TW); Hsien-Chun Meng, Taipei (TW); Ching-Yi Wang, Taipei (TW); San-Wen Chen, Taipei (TW)

(73) Assignee: BLUEPLANET INC., Taipei (TW)

( * ) Notice: Subject to any disclaimer, the term of this patent is extended or adjusted under 35 U.S.C. 154(b) by 34 days.

(21) Appl. No.: 18/300,639

(22) Filed: Apr. 14, 2023

(65) Prior Publication Data

US 2024/0345701 A1 Oct. 17, 2024

(51) Int. Cl.
*G06Q 40/06* (2012.01)
*G06F 3/0482* (2013.01)
*G06F 3/04845* (2022.01)

(52) U.S. Cl.
CPC ........ *G06F 3/0482* (2013.01); *G06F 3/04845* (2013.01); *G06Q 40/06* (2013.01)

(58) Field of Classification Search
CPC .... G06F 3/0482; G06F 3/04845; G06Q 40/06
See application file for complete search history.

(56) References Cited

U.S. PATENT DOCUMENTS

| | | | |
|---|---|---|---|
| 10,722,649 B2 | 7/2020 | Tang | |
| 2014/0214943 A1* | 7/2014 | Shapero | G06Q 50/01 |
| | | | 709/204 |
| 2016/0253759 A1* | 9/2016 | Decanini | G06Q 40/06 |
| | | | 705/36 R |
| 2018/0276754 A1* | 9/2018 | Agbamu | G06Q 10/06393 |
| 2022/0366622 A1* | 11/2022 | Brogger | G06T 11/60 |
| 2023/0004889 A1* | 1/2023 | Epstein | G06Q 10/0635 |

FOREIGN PATENT DOCUMENTS

| CN | 112634056 | 4/2021 |
|---|---|---|
| TW | M604015 U | 11/2020 |
| WO | WO2021098372 A1 | 5/2021 |

OTHER PUBLICATIONS

T-rank AS, "Integrated Ownership Calculation" (Year: 2023).*
Taiwanese Search Report and English translation regarding Taiwanese counterpart application No. 110144657 dated Jan. 31, 2023.

* cited by examiner

*Primary Examiner* — Beau D Spratt
(74) *Attorney, Agent, or Firm* — Crowell & Moring LLP

(57) ABSTRACT

A method for generating a tree diagram from a capitalization table of a company includes: generating a plurality of interactive icons that are associated with the company and partial owners of the company for the tree diagram, wherein the interactive icons include a root node icon that is associated with the company, and a plurality of stem node icons each associated with a respective one of partial owners; arranging the root node icon and the plurality of stem node icons in the tree diagram by determining an importance value determined for each of the stem node icons, and by arranging each of the stem node icons to have a distance from the root node icon that is inversely related to the importance value of the stem node icon; and plotting a plurality of investment routes, each connecting two of the interactive icons arranged in the tree diagram.

10 Claims, 6 Drawing Sheets

METHOD FOR GENERATING A TREE DIAGRAM FROM A CAPITALIZATION TABLE

FIELD

The disclosure relates to a method for generating a tree diagram, and more particularly to a method for generating a tree diagram from a capitalization table.

BACKGROUND

In the field of finance, a capitalization table is a ledger that contains information of ownership of a company. The capitalization table has been a crucial element in banking. It is noted that as the company grows bigger, the ownership may become increasingly complex, and more beneficial owners of the company may be involved. In commercial law, the term "beneficial owner" typically is defined as and refers to a natural person who ultimately owns or controls the company. In practice, the beneficial owner may own directly or indirectly more than a certain percentage of controlling shares of the company (e.g., 25%). Since each of the beneficial owners may own interests in other entities that also own the company, presenting the relationships among the beneficial owner(s) and the entities may be a challenge.

SUMMARY

As strong demand for identifying beneficial ownership in a company persists, it is beneficial to introduce a new way of presenting information contained in a capitalization table in a manner that is more intuitive for users. Therefore, an object of the disclosure is to provide a method that generates a tree diagram from the capitalization table to present information included in the capitalization table more intuitively to the users.

According to the one embodiment of the disclosure, a method for generating a tree diagram from a capitalization table of a company in provided. Content of the capitalization table includes a name of the company, and a plurality of partial-owner related datasets. Each of the partial-owner related datasets includes a name of a partial owner, a type of entity of the partial owner, a property owned by the partial owner, and a percentage of ownership of the property owned by the partial owner. The method is implemented using a processor of an electronic device and includes the steps of:

in response to receipt of user input instructions, loading the capitalization table of the company;

generating a plurality of interactive icons that are associated with the company and the partial owners for the tree diagram, wherein the interactive icons include a root node icon that is associated with the company, and a plurality of stem node icons that each are associated with a respective one of the partial-owner related datasets;

arranging the plurality of interactive icons including root node icon and the plurality of stem node icons in the tree diagram, wherein arranging the plurality of stem node icons includes determining an importance value for each of the stem node icons based on the type of entity of the partial owner associated with the stem node icon, and the percentage of ownership of the property owned by the partial owner, and arranging each of the stem node icons to have a distance from the root node icon that is inversely related to the importance value of the stem node icon; and plotting a plurality of investment routes, each connecting two interactive icons arranged in the tree diagram.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
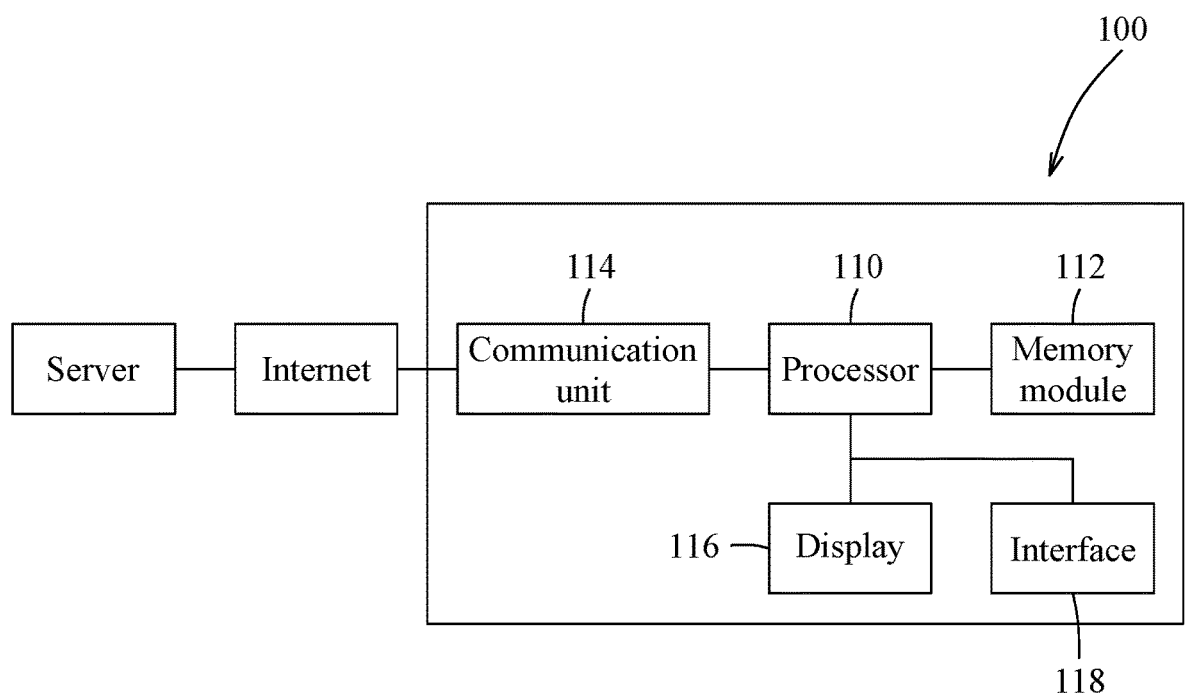
FIG. 1 is a block diagram illustrating an electronic device according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

FIG. 1 is a block diagram illustrating an electronic device 100 according to one embodiment of the disclosure. In this embodiment, the electronic device 100 is embodied using a computer, and includes a processor 110, a memory module 112, a communication unit 114, a display 116, and an interface 118.

The processor 110 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The memory module 112 is connected to the processor 110, and may be embodied using, for example, random access memory (RAM), read only memory (ROM), programmable ROM (PROM), firmware, and/or flash memory, etc. The memory module 112 stores a software application including instructions that, when executed by the processor 110, cause the processor 110 to perform operations as described below.

The communication unit 114 is connected to the processor 110, and may include one or more of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G), the fourth generation (4G) or fifth generation (5G) of wireless mobile telecommunications technology, or the like.

The display 116 is connected to the processor 110, and may be embodied using a liquid crystal display (LCD), a light-emitting diode (LED) display or other forms of displays.

The interface 118 is connected to the processor 110, and may be embodied using a keyboard, a mouse, etc. In some embodiments, the display 116 and the interface 118 may be integrated using a touch screen.

In use, the electronic device 100 may be associated with a user (a natural person, a representative of a legal entity such as a bank or a law firm, etc.), and the user may intend to view ownership of a company. As such, the user may operate the interface 118 to control the electronic device 100 to implement a method for generating a tree diagram from a capitalization table. Specifically, the user may operate the interface 118 to control the electronic device 100 to execute the software application stored in the memory module 112.

Figure 2:
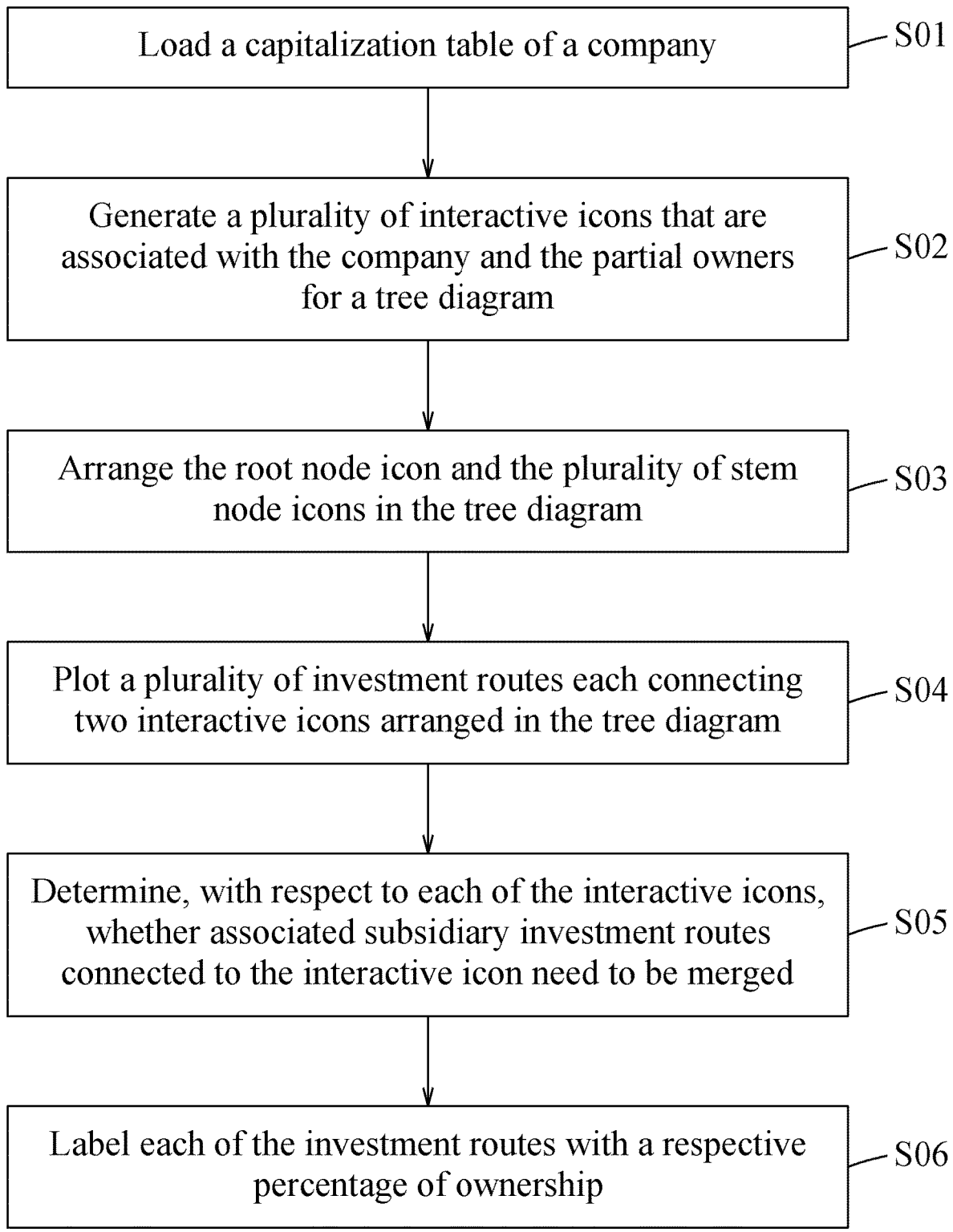
FIG. 2 is a flow chart illustrating steps of a method for generating a tree diagram from a capitalization table according to one embodiment of the disclosure.

FIG. 2 is a flow chart illustrating steps of a method for generating the tree diagram from the capitalization table according to one embodiment of the disclosure. In this embodiment, the method is implemented using the electronic device 100 shown in FIG. 1.

In step S01, in response to receipt of user input instructions from the interface 118, the processor 110 executing the software application loads the capitalization table of the company.

Specifically, the capitalization table may be pre-stored in the memory module 112, or may be obtained from a server through a network (e.g., the Internet) by the communication unit 114. The capitalization table includes information related to the ownership of the company. For example, in this embodiment, content of the capitalization table includes a name of the company, and a plurality of partial-owner related datasets. Each of the partial-owner related datasets includes a name of a partial owner, a type of entity of the partial owner, a property owned by the partial owner, and a percentage of ownership of the property owned by the partial owner. Specifically, the type of entity of the partial owner may be a natural person, a domestic juridical person (e.g., a company, a firm, a foundation, an educational institution, etc.), a governmental institution, a foreign juridical person, etc. The property owned by the partial owner may be the company or another partial owner.

In step S02, the processor 110 generates a plurality of interactive icons that are associated with the company and the partial owners for the tree diagram. Specifically, the processor 110 generates a root node icon that is associated with the company, and a plurality of stem node icons that are associated with the partial owners, respectively. Each of the partial owners may own directly or indirectly a percentage of the company. Content of the stem node icons is obtained from the partial-owner related datasets.

Figure 3:
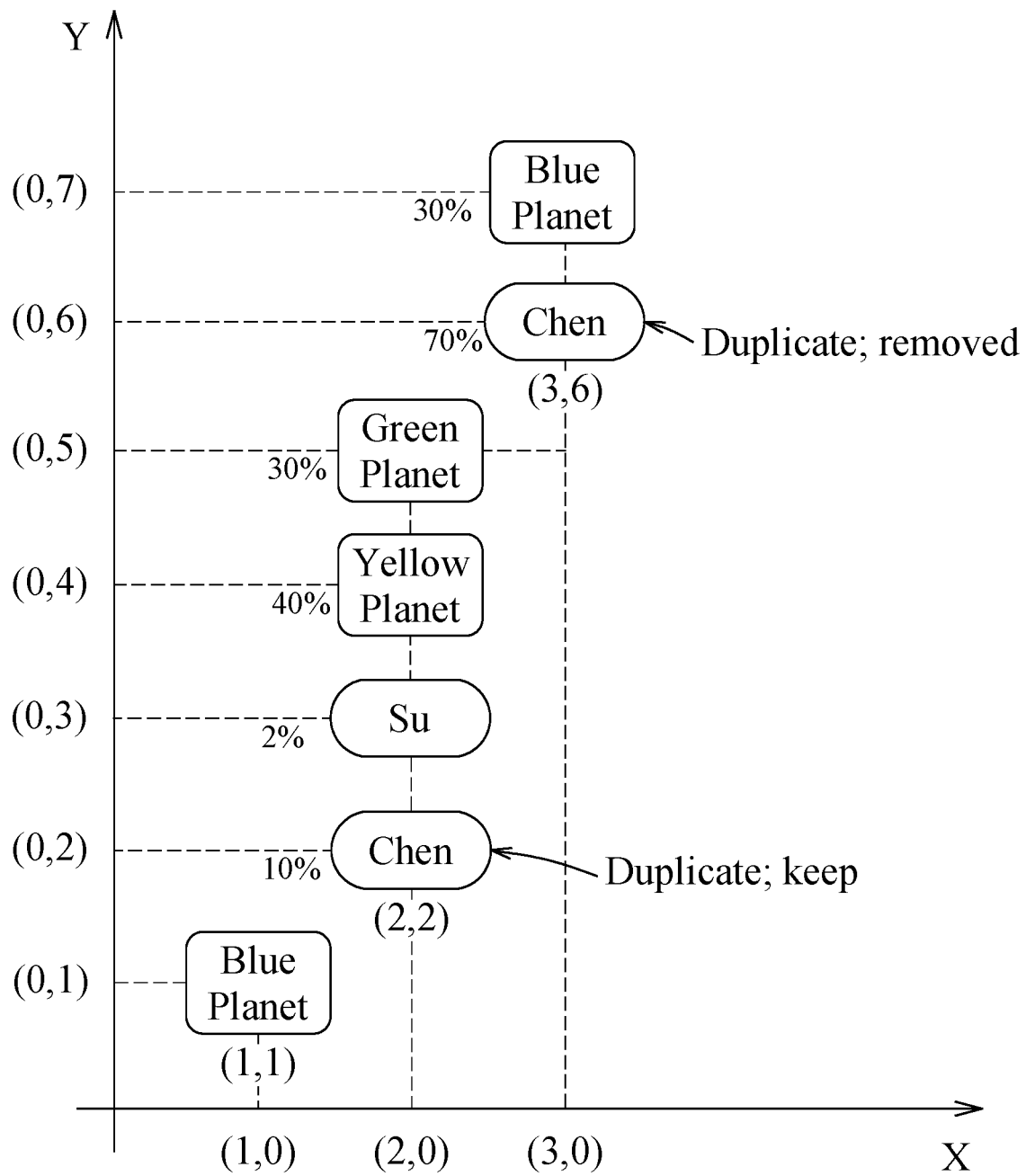
FIG. 3 is an exemplary partial tree diagram according to one embodiment of the disclosure.

Specifically, FIG. 3 is an exemplary partial tree diagram according to one embodiment of the disclosure. In this embodiment, four direct partial owners "Chen," "Su," "Yellow Planet," and "Green Planet" are present, where Chen and Su are natural persons and Yellow Planet and Green Planet are domestic juridical persons. From the content of the capitalization table, it may be determined that the partial owner Chen owns 10% of the company, the partial owner Su owns 2% of the company, the partial owner Yellow Planet owns 40% of the company, and the partial owner Green Planet owns 30% of the company.

Four stem node icons are generated for the direct partial owners, respectively. It is noted that shape of the stem node icon of the natural person may be different from that of the juridical person. In the example of FIG. 3, the natural person is represented by an oval shape with corner radius of 40 pixels (px), and the juridical person is represented by a rounded rectangular shape with corner radius of 8 px. The governmental institution and the foreign juridical person may each be represented by the rounded rectangular shape that is similar to the shape used for the juridical person, but in different colors.

It is noted that in some cases, some of the direct partial owners themselves are companies or institutions, and are owned by partial owners who may be natural persons and/or juridical persons. For the partial owners of those direct partial owners, the stem node icons may also be generated. In the example shown in FIG. 3, two stem node icons are generated for two partial owners owning the direct partial owner Green Planet.

In step S03, the processor 110 arranges the root node icon and the plurality of stem node icons in the tree diagram.

Specifically, the partial tree diagram is in the form of a two-dimension plot that uses Cartasian coordinates. That is to say, the partial tree diagram has a horizontal axis (i.e., the X axis) and a vertical axis (i.e., the Y axis), and the interactive icons located in the plot may be represented using different sets of (X, Y) coordinates. In this embodiment, the root node icon with the name "Blue Planet" is generated and is at (1, 1). That is to say, this root node icon is on the line X=1, and may be considered as a "root" of the tree diagram. Then, the stem node icons, each being associated with a respective one of the partial owners with direct ownership of the company Blue Planet, are arranged on the line X=2. That is to say, when only taking the X axis into consideration, the root node icon is disposed at a position different from where the stem node icons are disposed at. The line X=2 may also be referred to as a first layer, and corresponds to the direct partial owners of the company. That is to say, the interactive icons associated with the direct partial owners of the company are arranged in the first layer.

Then, in arranging the stem node icons, the processor 110 adopts the following rules: each of the stem node icons of the direct partial owners is assigned with an importance value based on the type of entity (natural person or juridical person) and the percentage of ownership of the company, and a distance between the stem node icon of the direct partial owner and the root node icon is inversely related to the importance value of the stem node icon.

Specifically, the importance value related to a natural person is automatically greater than a partial owner who is not a natural person (e.g., a juridical person). The is to say, the processor 110 is configured to assign an importance value of the stem node icon associated with a partial owner who is a natural person to be greater than that of the stem node icon associated with a partial owner who is not a natural person.

Furthermore, for each type of entity of the partial owner, the processor 110 is configured to assign the importance value of the stem node icons that is positively related to the percentage of the ownership of the company. Specifically, the greater the percentage of ownership of the company that the direct partial owner has, the smaller the distance between the stem node icon of the direct partial owner and the root node icon. In the case that multiple direct partial owners with the same type of entity have the same percentage of ownership, the importance values may be decided based on alphabetical order, or, in the case of Traditional Chinese names, number of strokes of the first character in the name of each of the direct partial owners. In this example, the direct partial owners with fewer strokes of the first character in the name will be assigned with a greater importance value.

In the example, the percentage of ownership of the natural person Chen (10%) is greater than the percentage of ownership of the natural person Su (2%), and therefore the importance value of Chen is greater than that of Su. In such way, the stem node icon of the natural person Chen will be disposed closer to the root node icon than the stem node icon of the natural person Su disposed to the root note icon. Similarly, the importance value of the partial owner Yellow Planet (40% of ownership) is greater than that of the partial owner Green Planet (30% of ownership). As a result, the four direct partial owners are sorted based on their importance values from highest to lowest in the following order: Chen, Su, Yellow Planet and Green Planet.

The resulting arrangement is shown in FIG. 3, where the stem node icon associated with the natural person Chen is disposed at (2, 2), which is closest to the root node icon. That is to say, when only taking the Y axis into consideration, the root node icon and the stem node icon are arranged at different positions. Then, the stem node icon associated with the natural person Su is disposed at (2, 3), which is on the same line X=2, and is farther away from the root node icon than the stem node icon associated with the natural person Chen. Subsequently, the stem node icon associated with the juridical person Yellow Planet is disposed at (2, 4), and the stem node icon associated with the juridical person Green Planet is disposed at (2, 5).

After the stem node icons for the direct partial owners are arranged, for each of the direct partial owners who also has one or more direct partial owners (entities that own a percentage of the direct partial owner), one or more stem node icons may be further generated in step S02 and arranged in step S03. It is noted that those who are direct partial owners of the direct partial owners of the company Blue Planet may be referred to as indirect partial owners.

In this embodiment, the juridical person Green Planet has two direct partial owners: Su, who is a natural person with a 70% of ownership and a direct partial owner of the company Blue Planet, and Red Planet, who is a juridical person and has a 30% of ownership.

In arranging the above indirect partial owners, the stem node icon associated with the more important indirect partial owner (i.e., the natural person Su having a higher percentage of ownership) is disposed at (3, 6), and the stem node icon associated with the less important indirect partial owner (i.e., the juridical person Red Planet having a lower percentage of ownership) is disposed at (3, 7). It is noted that the stem node icons of the indirect partial owners are arranged on the line X=3. The line X=3 may also be referred to as a second layer, and corresponds to the indirect partial owners of the company (i.e., direct partial owners of the direct partial owners of the company). That is to say, the interactive icons associated with the aforesaid indirect partial owners of the company are arranged in the second layer.

Moreover, the arrangement of the interactive icons includes, for each of the interactive icons, arranging the interactive icon in one of the different layers based on a relationship between the corresponding partial owner and the company.

It is noted that in this embodiment, the different layers are spaced apart from one another along a first direction (i.e., the horizontal direction in the example of FIG. 3), and the interactive icons in a same layer are aligned along a second direction perpendicular to the first direction, (i.e., the vertical direction in the example of FIG. 3).

In the cases that one of the indirect partial owners (e.g., the juridical person Red Planet) also has one or more direct partial owners, more stem node icon may be generated and arranged on the line X=4 in a manner that is similar to that as described above.

In this embodiment, in order to simplify presentation of the tree diagram, when a specific entity (e.g., the company or one of the partial owners) appears more than once in the tree diagram, only one interactive icon that represents the entity and that is the most important is kept, and other interactive icons that are deemed as duplicates will be removed. That is to say, in the case that multiple interactive icons associated with the same entity are generated, the processor 110 is configured to select one of the interactive icons as a representative interactive icon for the entity that appears more than once in the tree diagram, keep the representative interactive icon in the tree diagram, and remove other interactive icons from the tree diagram.

Figure 4:
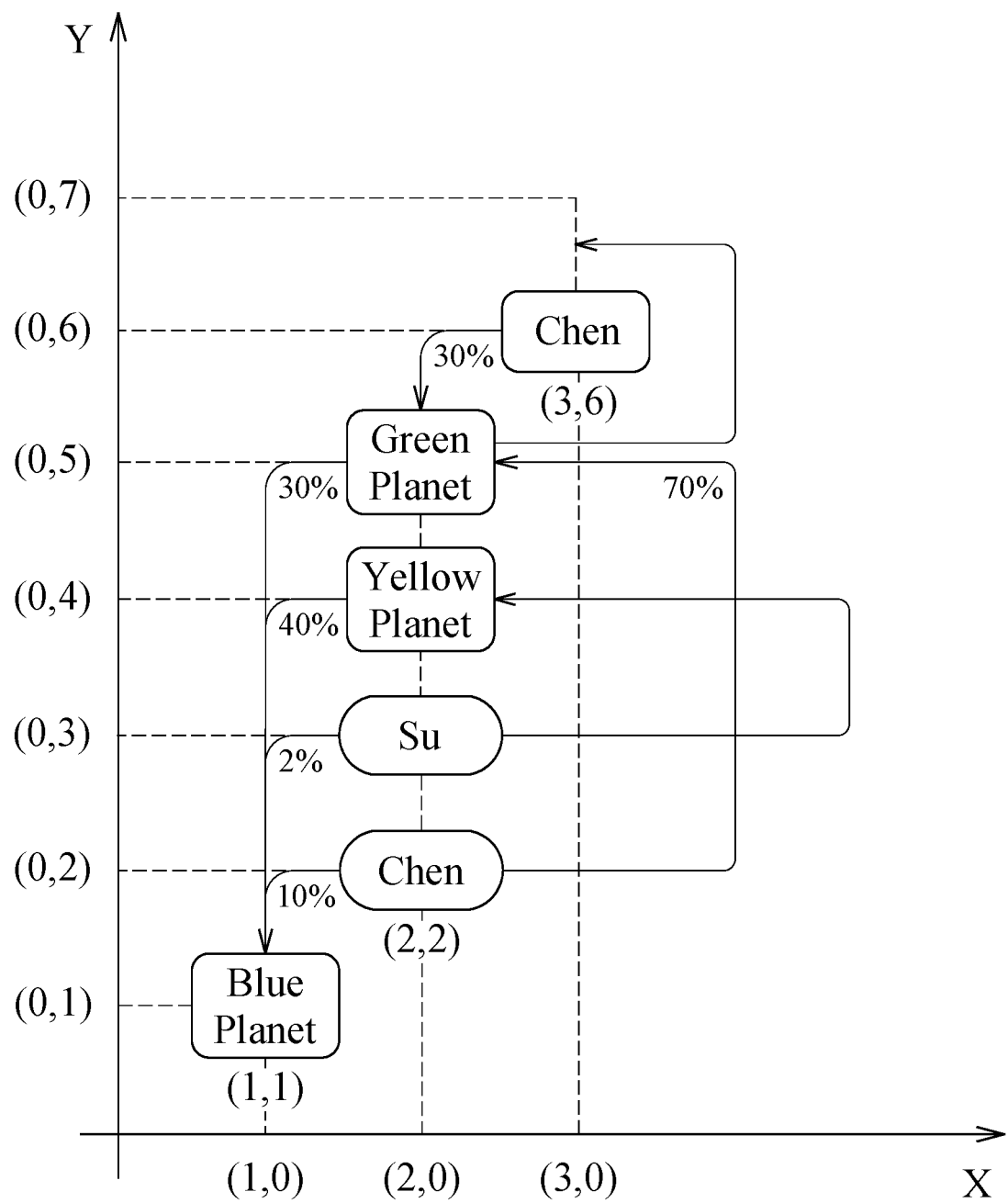
FIG. 4 is an exemplary partial tree diagram with a duplicate interactive icon removed.

In the example of FIG. 3, the natural person "Chen" appears more than once, i.e., at coordinates (2, 2) and (3, 6). In this case, the stem node icon at (2, 2) is kept, the stem node icon (3, 6) is removed, and the stem node icon originally located at (3, 7) is moved to (3, 6). FIG. 4 is an exemplary partial tree diagram with a duplicate interactive icon removed. That is to say, when multiple interactive icons representing the same entity appear in different layers (in this example, the first and the second layers), the interactive icon appearing the layer that is closest to the root node icon is selected as the representative interactive icon. In the case that multiple interactive icons representing the same entity appear in the same layer, the interactive icon appearing in the layer that is the closest to the root node icon (i.e., at a lowest location) is selected as the representative interactive icon.

It is noted that in the case that the company represented by the root node icon is also a direct partial owner of other partial owners (e.g., a stem node icon associated with the company is generated), the root node icon is automatically selected as the representative interactive icon. That is to say, all of the stem node icon(s) indicating the company are removed, leaving only the root node icon in the tree diagram.

After the arrangement of the root node icon and the stem node icons is completed, in step S04, the processor 110 plots a plurality of investment routes each connecting two interactive icons arranged in the tree diagram.

Specifically, each of the direct or indirect partial owners owns the company. The ownership may be a direct ownership (in which the partial owner owns certain percentage of the company), an indirect ownership (in which the partial owner owns certain percentage of another partial owner), or both.

For direct ownerships, the processor 110 is configured to plot a main investment route from one of the stem node icons associated with a corresponding one of the partial owners to connect to another interactive icon associated with another entity partially owned by the corresponding one of the partial owners. For example, for the stem node icons arranged in the first layer, the main investment route may be plotted from one of the stem node icons associated with a corresponding one of the direct partial owners to connect to the root node icon.

In the example of FIG. 4, the main investment route from one of the stem node icons in the first layer may start from a left side of the one of the stem node icons, extend toward the left (opposite to the X axis) to reach the line X=1 (at a position above the root node icon), and extend downwardly to connect to a top side of the root node icon. The main investment route may include an arrow pointing toward the root node icon representing Blue Planet, which indicates that Blue Planet is receiving investment. It is noted that while four main investment routes converge into the line X=1 as shown in FIG. 4, in other embodiments, the four main investment routes may extend to the left with slightly different locations with respect to the X axis, resulting in the four main investment routes being separated from one another.

Similarly, the main investment route from one of the stem node icons in the second layer may start from the left side of the one of the stem node icons, extend toward the left (opposite to the X axis) to reach the line X=2 (at a position above another stem node icon), and extend downwardly to connect to the top side of the another stem node icon.

It is noted in this embodiment, the main investment routes are generated to represent a shortest path between the interactive icons using horizontal and vertical lines, and the corners of the main investment routes are designed with rounded corners, but other implementations may also be employed.

Then, a subsidiary investment route may be plotted from one of the stem node icons associated with a corresponding one of the partial owners to connect to another one of the stem node icons. This is conducted so as to be consistent with the practice that the specific entity is represented by only one interactive icon in this embodiment. That is to say, the processor 110 is configured to plot the subsidiary investment route from the representative interactive icon associated with the specific entity to connect to another one of the stem node icons.

In this example, the processor 110 is configured to determine, first with respect to the root node (which may also be a partial owner to other entities), whether the subsidiary investment route is needed. Then, the processor 110 is configured to determine, with respect to the first layer for each of the partial owners, whether the subsidiary investment route is needed.

Generally, the subsidiary investment route is needed when multiple interactive icons associated with the same entity were generated and detected, and at least one interactive icon was removed. In such cases, an association between the removed interactive icon and another interactive icon is not represented in plotting of the main investment route, and therefore needs to be represented using the subsidiary investment route.

In the example of FIG. 4, it is established that the juridical person Green Planet has a partial owner, Chen, who is a natural person with a 70% ownership and a direct partial owner of Green Planet. In this case, the subsidiary investment route may be plotted from the stem node icon representing Chen to the stem node icon representing Green Planet.

Specifically, the subsidiary investment route from the stem node icon representing the partial owner Chen in the first layer may start from a right side (which is a side opposite to the side from which the main investment route starts) of the one of the stem node icons at (2, 2), extend toward the right (which is a direction opposite to the main investment route) to reach the line X=4 (at least two layers apart from the first layer, but is not limited to such), extend upwardly to reach the line Y=5 (to the right to the stem node icon representing Green Planet), and extend to the left to connect to the right side of the stem node icon representing Green Planet. The subsidiary investment route may include an arrow pointing toward the stem node icon representing Green Planet, which indicates that Green Planet is receiving investment from the partial owner. It is noted that in the case that the partial owner Chen is a partial owner for more than one partial owner of the company Blue Planet, additional subsidiary investment routes may be plotted in a similar manner.

Then, in the case that another one of the four direct partial owners is a partial owner of yet another one of the four direct partial owners (e.g., Su being a partial owner of Yellow Planet), another subsidiary investment route may be plotted in the following manner.

Specifically, the subsidiary investment route from the stem node icon representing the partial owner Su in the first layer and at (2, 3) may start from the right side of the stem node icon, extend toward the right to reach the line X=5 (which is at least one layer farther than the previously plotted subsidiary investment route, but is not limited to such), extend upwardly to reach the line Y=4 (to the right to the stem node icon representing Yellow Planet), and extend to the left to connect to the right side of the stem node icon representing Yellow Planet. It is noted that in this embodiment, plotting of the subsidiary investment route with respect to the first layer may start with the more important partial owner (i.e., located lower in the tree diagram) and proceed upwardly to other partial owners, and a vertical segment of the subsidiary investment route of the more important partial owner is designed to be closer to the root node icon (e.g., the subsidiary investment route for Chen has the vertical segment represented by X=4, and the subsidiary investment route for Su has the vertical segment represented by X=5).

Generally, in this embodiment, the plotting of the subsidiary investment route starts from the representative interactive icon, and extends in the first direction to form a horizontal segment before connecting to the another one of the stem node icons. In addition, a length of the horizontal segment is positively related to the distance between the representative interactive icon, toward which the arrow of the subsidiary investment route is pointed, to the root node icon.

Figure 5:
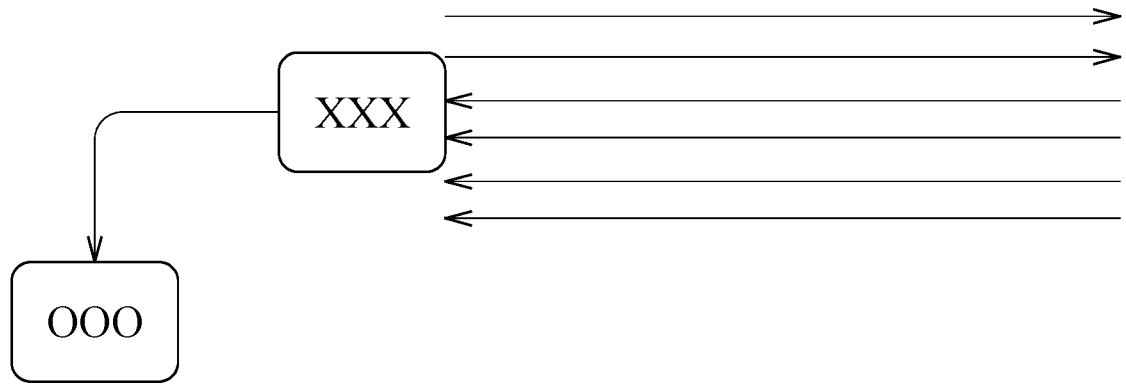
FIG. 5 illustrates an exemplary interactive icon with a plurality of incoming subsidiary investment routes and a plurality of outgoing subsidiary investment routes connected.

Using the above manner, the subsidiary investment route may be plotted for other partial owners. As shown in FIG. 5, for a specific interactive icon, in the case that both incoming subsidiary investment routes (subsidiary investment routes that ends at the interactive icon, with an arrow pointing toward the interactive icon) and outgoing subsidiary investment routes (subsidiary investment routes that starts at the interactive icon, with an arrow pointing away from the interactive icon) are connected to the specific interactive icon, the ends of incoming subsidiary investment routes are arranged at the lower right side of the interactive icon, and the ends of outgoing subsidiary investment routes are arranged at the upper right side of the interactive icon.

Figure 6:
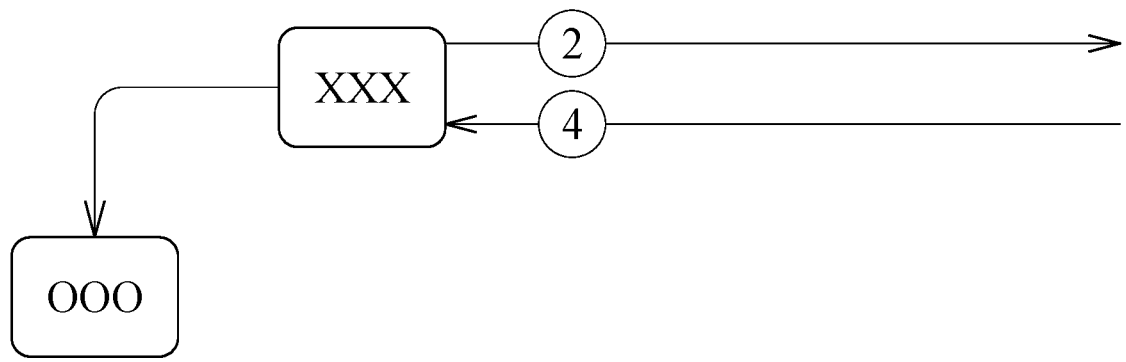
FIG. 6 illustrates an exemplary interactive icon with both the plurality of incoming subsidiary investment routes and the plurality of outgoing subsidiary investment routes being separately combined.

Then, in step S05, the processor 110 determines, with respect to each of the interactive icons, whether associated subsidiary investment routes connected to the interactive icon need to be merged. In other words, the processor 110 determines, with respect to each of the interactive icons, whether a plurality of incoming subsidiary investment routes connected to the interactive icon are present, and whether a plurality of outgoing subsidiary investment routes connected to the interactive icon are present. In the example of FIG. 5, four incoming subsidiary investment routes and two outgoing investment routes are present. In this embodiment, it may be determined that when more than one incoming subsidiary investment routes or more than one outgoing investment routes are present, the incoming subsidiary investment routes or the outgoing investment routes are to be merged in order to make a resulting tree diagram visually simpler. As such, the associated subsidiary investment routes are to be merged. FIG. 6 illustrates the interactive icons of FIG. 5, with the associated subsidiary investment routes merged. Specifically, four horizontal segments of the four incoming subsidiary investment routes are merged into one combined horizontal segment, and an expanding button labeled with number of horizontal segments thus combined (e.g., a circle with the number 4) is added to the combined horizontal segment. Similarly, two horizontal segments of the two outgoing subsidiary investment routes are merged into one combined horizontal segment, and the expanding button labeled with the number of horizontal segments thus combined (e.g., the circle with the number 2) is added to the combined horizontal segment.

It is noted that in some embodiments, step S05 may be omitted. Afterward, the flow proceeds to step S06.

In step S06, the processor 110 labels each of the investment routes with a respective percentage of ownership. In the example of FIG. 4, for each of the main investment routes, the percentage is shown near the rounded corner of the main investment route. For each of the subsidiary investment routes, the percentage is shown near an upper rounded corner of the subsidiary investment route, but is not limited to such. At this stage, generation of the tree diagram is completed, and the process is terminated. The resulting tree diagram may then be displayed on the display 116 of the electronic device 100, or be transmitted (e.g., via the Internet) in the form of a data file for display by another electronic device.

Figure 7:
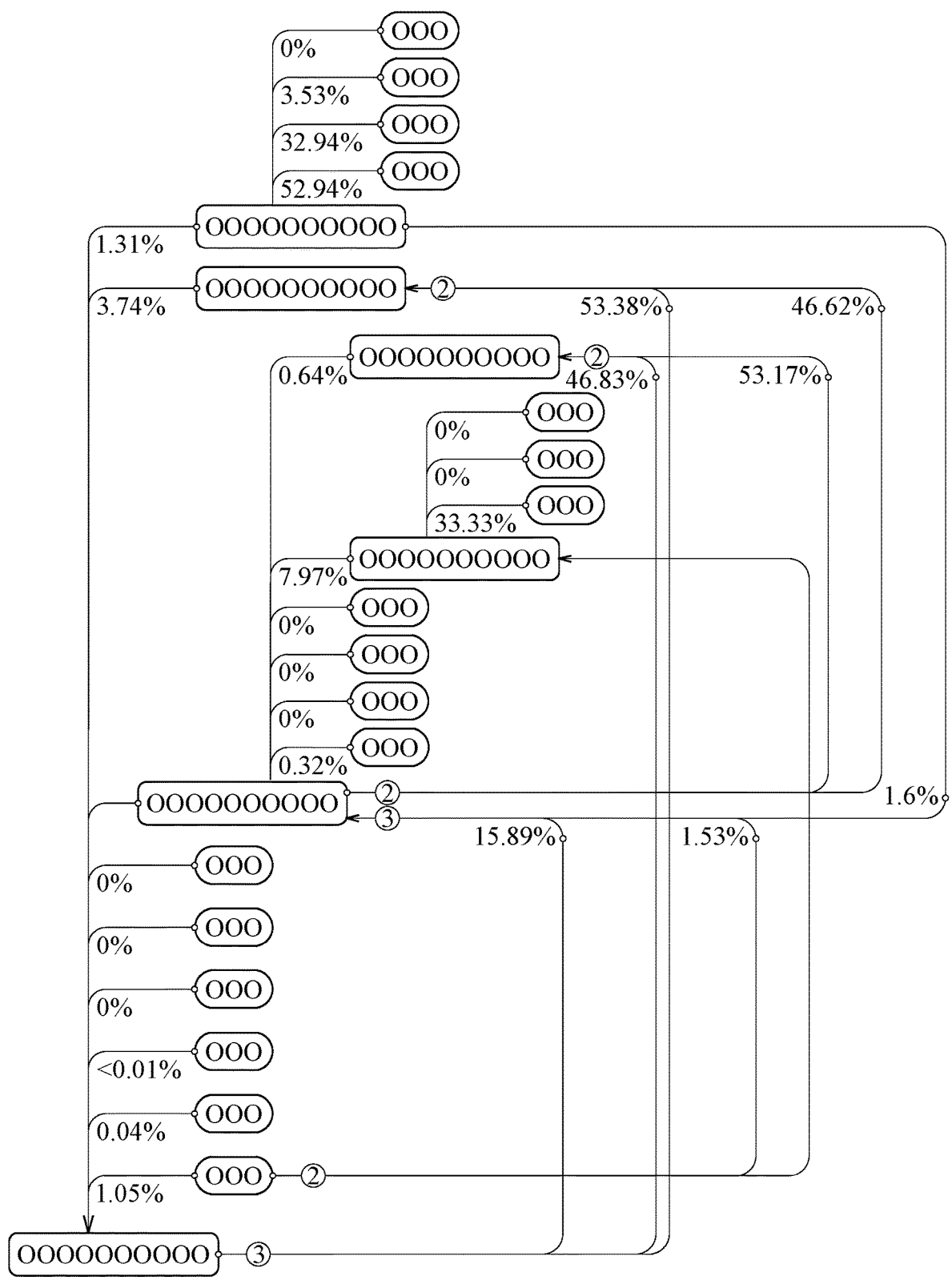
FIG. 7 illustrates an exemplary tree diagram that is generated using the method as shown in FIG. 2.

FIG. 7 illustrates an exemplary tree diagram that is generated using the above method. This view may be what the user sees on the display 116 when he/she operates the electronic device 100 to generate the tree diagram, or to access a pre-generated tree diagram. Each of the interactive icons may be interactive. For example, when the user operates a mouse to click on one of the stem node icons, the processor 110 may in turn call a panel to display the information associated with the partial owner. The information may include a name of the partial owner, the percentage of ownership of the partial owner, whether the partial owner is a beneficial owner, whether the partial owner is a company listed in a stock exchange (e.g., the Taiwan Stock Exchange), whether the partial owner is a company listed in an over-the-counter (OTC) market, etc. In use, when the expanding button labeled with the number of horizontal segments is clicked, the processor 110 may expand the combined horizontal segment to show all of the horizontal segments that are parallel to one another. In practice, the term "beneficial owner" may be defined as the partial owner who owns directly or indirectly more than a certain percentage of controlling shares of the company (e.g., 25%).

In sum up, the embodiments of the disclosure provides a method for generating the tree diagram from the capitalization table of the company. Using this method, association among the partial owners and the company may be more clearly presented in the tree diagram, with the importance of each of the partial owners being presented by the distances between the partial owners and the root node icon. In addition, in the case that there are too many subsidiary investment routes for specific interactive icons, the horizontal segments of the subsidiary investment routes may be compressed into one compressed segment, so as to render a more streamlined representation of the capitalization table.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for generating a tree diagram from a capitalization table of a company, content of the capitalization table including a name of the company, and a plurality of partial-owner related datasets, each of the partial-owner related datasets including a name of a partial owner, a type of entity of the partial owner, a property owned by the partial owner, and a percentage of ownership of the property owned by the partial owner, the type of entity of the partial owner being one of a natural person, a domestic juridical person, a governmental institution and a foreign juridical person, the method being implemented using a processor of an electronic device and comprising the steps of:

in response to receipt of user input instructions, loading the capitalization table of the company;

generating a plurality of interactive icons that are associated with the company and the partial owners for the tree diagram, wherein the interactive icons include a root node icon that is associated with the company, and a plurality of stem node icons that each are associated with a respective one of the partial-owner related datasets;

arranging the plurality of interactive icons including root node icon and the plurality of stem node icons in the tree diagram, wherein arranging the plurality of stem node icons includes:

determining an importance value for each of the stem node icons based on the type of entity of the partial owner associated with the stem node icon, and the percentage of ownership of the property owned by the partial owner, and arranging each of the stem node icons to have a distance from the root node icon that is inversely related to the importance value of the stem node icon; and plotting a plurality of investment routes, each connecting two interactive icons arranged in the tree diagram;

wherein the determining an importance value for each of the stem node icons includes:

assigning the importance value of the stem node icon associated with the partial owner that is a natural person to be higher than that of the stem node icon associated with the partial owner that is not a natural person; and for each of the partial owners that is a natural person, assigning the importance value of the stem node icon that is positively related to the percentage of the ownership of the company;

for each of the partial owners that is not a natural person, assigning the importance value of the stem node icon that is positively related to the percentage of the ownership of the company.

2. The method as claimed in claim 1, further comprising:

in a case that multiple interactive icons associated with a same entity are generated, selecting one of the interactive icons as a representative interactive icon for the entity in the tree diagram, keeping the representative interactive icon in the tree diagram, and removing other interactive icons from the tree diagram;

wherein the plotting a plurality of investment routes includes:

plotting a main investment route from one of the stem node icons associated with a corresponding one of the partial owners to connect to another interactive icon associated with another entity partially owned by the corresponding one of the partial owners, and plotting a subsidiary investment route from the representative interactive icon associated with the entity to connect to another one of the stem node icons.

3. The method as claimed in claim 2, wherein:

arranging the plurality of interactive icons in the tree diagram includes, for each of the interactive icons, arranging the interactive icon in one of different layers of the tree diagram based on a relationship between the corresponding partial owner and the company; and the selecting one of the interactive icons as a representative interactive icon includes:

in the case that multiple interactive icons representing the same entity appear in different layers of the tree diagram, the interactive icon appearing a layer that is closest to the root node icon is selected as the representative interactive icon, and in the case that multiple interactive icons representing the same entity appear in a same layer, the interactive icon appearing in the layer that is closest to the root node icon is selected as the representative interactive icon.

4. The method as claimed in claim 3, wherein in the case that at least one stem node icon associated with the company is generated, the root node icon is selected as the representative interactive icon.

5. The method as claimed in claim 3, wherein the different layers are spaced apart from one another along a first direction, and the interactive icons in a same layer are aligned along a second direction perpendicular to the first direction.

6. The method as claimed in claim 5, wherein:

the plotting the subsidiary investment route includes plotting the subsidiary investment route to start from the representative interactive icon, and extend in the first direction to form a horizontal segment before connecting to the another one of the stem node icons;

a length of the horizontal segment is positively related to the distance between the representative interactive icon to the root node icon.

7. The method as claimed in claim 2, wherein the main investment route starts from one side of the one of the stem node icons which is the representative interactive icon, and the subsidiary investment route starts from another side of the representative interactive icon that is different from the one side of the representative interactive icon.

8. The method as claimed in claim 2, further comprising:

determining, with respect to each of the interactive icons, whether a plurality of incoming subsidiary investment routes connected to the interactive icon are present, and whether a plurality of outgoing subsidiary investment routes connected to the interactive icon are present;

in the case that a plurality of incoming subsidiary investment routes connected to the interactive icon are present, combining horizontal segments of the plurality of incoming subsidiary investment routes to form a combined horizontal segment; and in the case that a plurality of outgoing subsidiary investment routes connected to the interactive icon are present, combining horizontal segments of the plurality of outgoing subsidiary investment routes to form a combined horizontal segment.

9. The method as claimed in claim 8, further comprising:

adding an expanding button that is labeled with a number of the horizontal segments merged combined to form the combined horizontal segment.

10. The method as claimed in claim 1, further comprising labeling each of the investment routes with a respective percentage of ownership.

* * * * *